United States Patent [19]

Thornton

[11] 4,065,688
[45] Dec. 27, 1977

[54] HIGH-PRESSURE MERCURY-VAPOR DISCHARGE LAMP HAVING A LIGHT OUTPUT WITH INCANDESCENT CHARACTERISTICS

[75] Inventor: William A. Thornton, Cranford, N.J.

[73] Assignee: Westinghouse Electric Corporation, Pittsburgh, Pa.

[21] Appl. No.: 782,279

[22] Filed: Mar. 28, 1977

[51] Int. Cl.$^2$ .................... H01J 61/20; H01J 61/34; H01J 61/48
[52] U.S. Cl. ........................................ 313/25; 313/487
[58] Field of Search .................................. 313/25, 487

[56] References Cited

U.S. PATENT DOCUMENTS

| | | | |
|---|---|---|---|
| 3,825,792 | 7/1974 | Rokosz et al. | 313/487 |
| 3,866,083 | 2/1975 | Datta et al. | 313/487 |
| 4,029,983 | 6/1977 | Thornton | 313/25 |

Primary Examiner—Palmer C. Demeo
Attorney, Agent, or Firm—D. S. Buleza

[57] ABSTRACT

The light output of a high-presure discharge lamp that employs a mercury arc tube is selectively modified by two luminescent coatings on the inner surface of the outer protective envelope to provide color rendering and a source-color that are similar to those of an incandescent-type lamp. The coating in contact with the envelope surface comprises a blend of two selected phosphors — one which absorbs and is excited by blue-violet radiations produced by the arc discharge and emits in the green portion of the spectrum, and another which also absorbs and is excited by the blue-violet radiations and by yellow radiations produced by the discharge and emits in the red portion of the spectrum. The second luminescent coating facing the arc tube comprises a phosphor that absorbs ultraviolet radiations produced by the mercury discharge and converts them into red radiations. The ultraviolet-converting phosphor coating is such that it transmits blue-violet and yellow radiations generated by the arc tube so that they can be absorbed and converted by the first phosphor coating. The desired color-rendering characteristics and reduction in the color temperature of the light emission are achieved with a minimum drop in light output and efficacy by using a mixture of green-emitting CaS:Ce phosphor and red-emitting CaS:Eu phosphor as the first-applied coating, and europium-activated yttrium vanadate phosphate phosphor as the second coating. Various other combinations of phosphors for the two luminescent coatings are also disclosed.

11 Claims, 5 Drawing Figures

HIGH-PRESSURE MERCURY-VAPOR DISCHARGE LAMP HAVING A LIGHT OUTPUT WITH INCANDESCENT CHARACTERISTICS

BACKGROUND OF THE INVENTION

1. Field of the Invention

This invention generally relates to electric lamps and has particular reference to an improved high-pressure mercury-vapor dischare lamp having integral means for modifying the color-rendering characteristics and chromaticity of its light output.

2. Description of the Prior Art

High-pressure mercury-vapor discharge (HPMV) lamps are well known in the art and employ arc tubes that generate radiations of various intensities in the ultraviolet and visible portions of the spectrum. In the visible region, the major line emissions occur at 405, 436, 546 and 578 nanometers (nm.). The most intense radiations in the ultraviolet region occur at 253, 296 and 365 nm. The light output of such lamps is thus deficient in red radiations (beyond 600 nm). As a result, their illumination characteristically has a bluish tint and distorts the colors of most objects.

In order to improve the color-rendering properties and source color of such lamps, it became the standard practice to coat the outer protective envelope with a phosphor that absorbed some of the ultraviolet radiation and converted it into red radiation. A HPMV lamp using an interior phosphor coating of manganese-activated magnesium fluorogermanate is disclosed in U.S. Pat. No. 2,748,303, issued May 1956 to Thorington. Another red-emitting phoshor used for this purpose is tin-activated strontium orthophosphate phosphor described in U.S. Pat. No. 3,110,680, issued November 1963 to Koelmans et al.

Further improvement is the ability of high-pressure mercury-vapor lamps to portray lighted objects in their true colors was achieved by coating the outer envelope with a copper-activated strontium phosphate type phosphor that emitted blue or green-blue radiations, and by mixing such a phosphor with red-emitting manganese fluorogermanate phosphor to provide a single layer of blended phosphors. A HPMV discharge lamp utilizing a luminescent coating of such phosphors is described in U.S. Pat. No. 3,328,620 issued June 1967 to Rimbach.

A high pressure mercury lamp utilizing a color-modifying coating of terbium-doped europium-activated yttrium vanadate phosphor which emits red radiation is disclosed in U.S. Pat. No. 3,480,819 issued November 1969 to Faria et al. Dysprosium-activated ytrrium vanadate type phosphors which employ various coactivators and emit in the red, yellow and blue-green regions of the spectrum have been proposed for use in HPMV lamps to improve their light output (U.S. Pat. No. 3,555,337 issued January 1971 to Faria et al).

The use of europium-activated yttrium vanadate phosphor as a color-modifying coating for HPMV lamps which adds orange-red radiations is disclosed in U.S. Pat. No. 3,569,762, issued Mar. 1971 to Levine et al. An article by Luscher and Datta in the January 1970 issue of "Illuminating Engineering" (Vol. 65, No. 1, pp. 49-53) also discloses the use of this phosphor, as well as red-emitting yttrium vanadate phosphate type phosphors, in HPMV lamps to improve their light output.

According to more recent developments in this field, the color rendition of HPMV type discharge lamps is enhanced by combining a blue-violet emitting phosphor (such as europium-activated strontium chlorophosphate) and an orange-red emitting phosphor (such as europium-activated ytrrium phosphate vanadate) and coating them onto the outer envelope in either two separate layers or as a single layer in the form of a two-component blend. A lamp of this type is disclosed in U.S. Pat. No. 3,670,194 issued June 1972 to Thornton et al.

Another modified HPMV lamp employs a coating on the outer envelope which consists of blended europium-activated strontium chlorosilicate and europium-activated yttrium vanadate phosphate phosphor which absorb ultraviolet radiation and emit in the blue-green and red portions of the spectrum, respectively. (U.S. Pat. No. 3,790,490 issued February 1974 to Datta et al).

A color-corrected HPMV lamp utilizing an outer envelope that is first coated with a non-luminescent coating of silica, titania, magnesia or alumina and then with a phosphor coating consisting of a blend of yttrium vanadate (or yttrium phosphate-vanadate) and magnesium fluorogermanate (or magnesium arsenate) which converts some of the ultraviolet radiation into red or orange-red emission and provides a light source having incandescent characteristics is described in U.S. Pat. No. 3,825,792 issued July 1974 to Rokosz et al.

Modification of a HPMV lamp to improve its color rendition and provide a color temperature in the range of 3200K to 4500K by coating the outer envelopes with a blend a blue-green emitting phosphor (europium-activated strontium chlorosilicate) and a red-emitting phosphor (europium-activated yttrium vanadate phosphate) which converts ultraviolet radiations into visible radiations of the respective colors is disclosed in U.S. Pat. No. 3,866,083 issued February 1975 to Datta et al.

The use of a sensitized cerium-activated calcium sulfide phosphor in a HPMV lamp to convert ultraviolet radiation into color-correcting visible radiation is suggested in U.S. Pat. No. 3,898,174 issued August 1975 to W. Lehmann.

While the prior art lamps greatly improved the color-rendering characteristics of HPMV lamps, the spectral distribution of their light outputs is such that color distortion of various articles illuminated by such lamps is still present to such a degree that the use of such lamps for interior lighting in department stores and similar applications is not commercially attractive. The color distortion is quite pronounced in the case of gold, blue and red articles. The golds are rendered more yellow-green, the blues more violet and the reds more purple — none of which is acceptable to a disconcerning department store shopper. It would accordingly be very desirable to provide a light source that has the high efficacy and long life of a HPMV discharge lamp and which also has a source-color and color-rendering characteristics which are similar to those of an incandescent lamp.

SUMMARY OF THE INVENTION

The foregoing objectives and advantages are achieved in accordance with the present invention by coating the outer envelope of a high-pressure mercury-vapor discharge lamp with two separate layers of luminescent material — one that absorbs primarily blue-violet radiations produced by the arc discharge and converts them into red and green radiations, and another that absorbs ultraviolet radiations emitted by the arc tube and converts them into red radiations.

In accordance with a preferred embodiment, the inner surface of the outer envelope is first coated with a mixture of green-emitting phosphor (such as CaS:Ce) and a red-emitting phosphor (such as CaS:Eu) and then with a second phosphor coating which transmits the visible radiations generated by the arc tube but absorbs ultraviolet radiations and converts them into red radiations (a phosphor such as yttrium vanadate phosphate). The dual-coatings of phosphor are so correlated with respect to their absorption and emission spectra that a portion of the ultraviolet radiations generated by the mercury discharge is converted into red radiations while undesirable blue-violet and yellow radiations, which are also produced by the arc tube and aggravate the color-distortion problems, are converted into green and red radiations. The coloration of rugs, fabrics and similar merchandise that is illuminated by the improved lamp is thus more pleasing and satisfying to the eye, even when compared to other types of color-corrected high-intensity discharge lamps presently being marketed. In contrast to phosphor-coated HPMV lamps of the prior art which make gold colored articles appear yellow-green, blue colored articles appear violet and red colored articles purple, the modified lamp of the present invention renders all of these colors in a more satisfactory manner.

In addition to improving the color-rendering characteristics of the HPMV lamp, the two layers of luminescent material reduce the color temperature of the mercury discharge from about 5800 Kelvin (K) to one in the range of from about 2600 to 3000K. The invention accordingly provides a light source that combines the high efficacy of an HPMV type lamp with the source color and color-rendering characteristics of an incandescent type lamp which has a color temperature of about 2800K. The improved lamps can thus be used with great advantage in the lighting of department stores and the like, as well as other lighting applications where the color-rendering characteristics of an incandescent lamp source are required and energy costs are a factor.

BRIEF DESCRIPTION OF THE DRAWINGS

A better understanding of the invention will be obtained from the exemplary embodiment shown in the accompanying drawings, in which.

DESCRIPTION OF THE PREFERRED EMBODIMENTS

While the present invention can be employed in HPMV lamps of various sizes and wattage ratings, it has been reduced to practice by modifying HPMV lamps of 400 watt rating and the invention has been so illustrated and will be so described.

Figure 1:
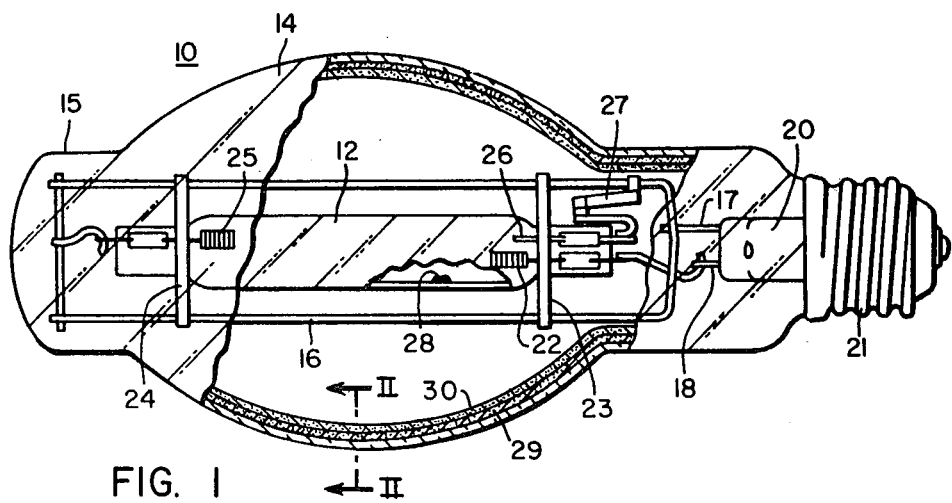
FIG. 1 is a side elevational view of a high-pressure mercury-vapor discharge lamp embodying the present invention, a portion of the outer envelope and arc tube being broken away for illustrative purposes.

In FIG. 1 there is shown a representative 400 watt high-pressure mercury-vapor discharge lamp 10 which embodies the present invention and contains the usual arc tube 12 that is supported within a light-transmitting outer envelope 14. The arc tube 12 is composed of suitable high-temperature material such as quartz and the outer envelope 14 is fabricated from hard glass. The arc tube 12 is held in centrally-located position within the outer envelope 14 in the usual fashion by a metal support-harness or frame 16 that is fastened to a lead wire 17 anchored in a glass stem 20 which is sealed to the envelope neck. A second lead wire 18 is embedded in the stem and, as illustrated, is connected to one of the arc tube electrodes 22 by a conductor that is fastened to a lead-in assembly embedded in the press seal which is formed at that end of the arc tube 12. The support frame 16 extends along the sides of the arc tube and its inner end nests within the tubular domed end 15 of the outer envelope 14. The arc tube 12 is mechanically locked within the support frame 16 by metal straps 23 and 24 that are fastened to the side members of the frame and engage the press seals of the arc tube. The frame 16 is electrically connected to the other main electrode 25 by a conductor that is fastened to the lead-in assembly embedded in the associated press seal. A starting electrode 26 at the opposite end of the arc tube is connected by another lead-in assembly and conductor to a starting resistor 27 that is connected to the adjacent side portion of the support frame in the usual fashion. The lead wires 17, 18 are connected to a suitable base 21 that is attached to the sealed neck of the envelope 14.

The arc tube 12 contains a small quantity of mercury 28 (66 mg. for example) and a suitable starting gas such as argon in accordance with standard lamp-making practice.

Figure 2:
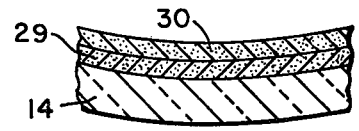
FIG. 2 is an enlarged cross-sectional view of a portion of the outer envelope, along line II—II of FIG. 1, showing the two interior layers of luminescent material.

Modification of the light generated by the mercury arc tube 12 is achieved pursuant to this invention by two layers 29, 30 of selected luminescent material that are coated onto the inner surface of the transparent outer envelope 14 (shown in enlarged detail in FIG. 2).

Before describing the light-modifying coatings, the prior art color-modified HPMV lamp which was used to obtain comparative test data will be discussed. The prior art lamp selected for this purpose was one made in accordance with the teachings of the aforementioned Rokosz et al Pat. No. 3,825,792. The lamp thus had an outer envelope that was first coated with a layer of non-luminescent material (such as silica or the like) and then with a phosphor layer consisting of a blend of from 70 to 90% by weight of yttrium vanadate phosphor or yttrium phosphate-vanadate phosphor and from 10 to 30% by weight of magnesium fluorogermanate or magnesium arsenate. While this combination of phosphors produces a marked shift in the color of the light emitted by the lamp which was very desirable commercially, studies have shown that the light output is still too rich in blue-violet emission (436 nm. wavelength region) and yellow emission (578 nm. wavelength region) — both of which are generated by the mercury arc tube. The resulting color-distortions in illuminated articles prevented the use of such lamps in large stores where true color-rendition was crucial.

Figure 3:
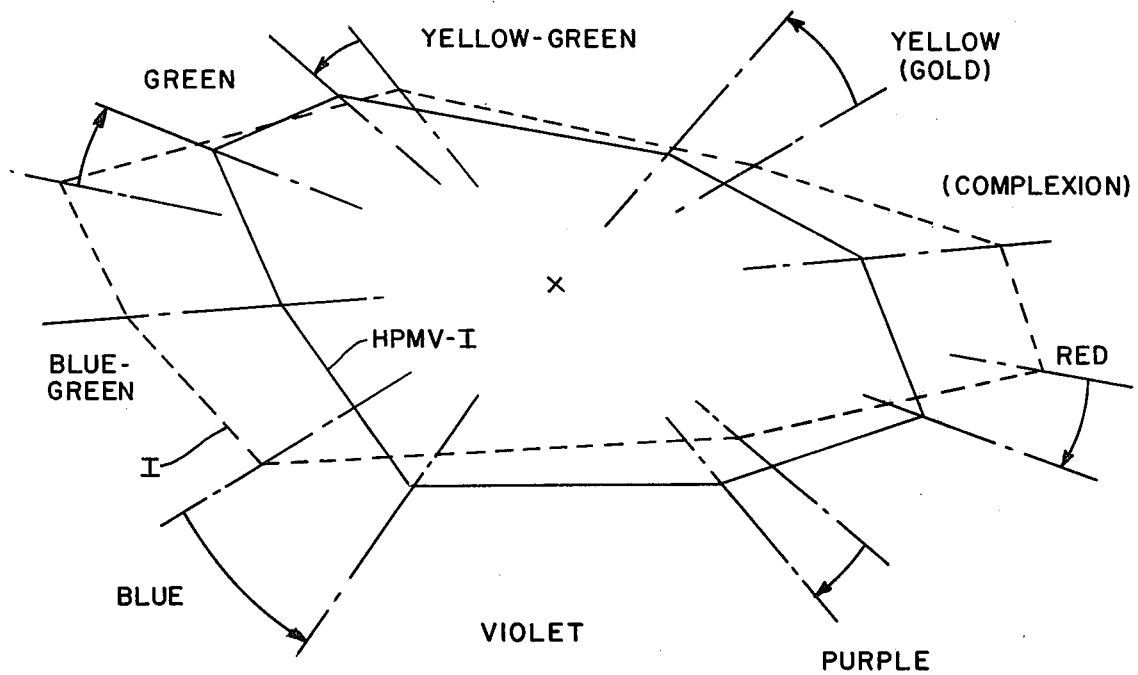
FIG. 3 is a color diagram comparing the gamuts of coloration of the eight CIE test-colors as rendered by a prior art color-corrected HPMV lamp made in accordance with the aforementioned Rokosz et al Pat. No. 3,825,792 and by an incandescent lamp source having a color temperature of about 2800K.

The distortion of the various colors produced when objects are illuminated by a Rokosz et al type color-modified HPMV lamp (silica coating and a phosphor coating containing 80% of yttrium phosphate-vanadate and 20% of magnesium fluorogermanate) and by an incandescent lamp having a color temperature of 2800K is graphically illustrated in FIG. 3. The gamut of coloration of the eight CIE test-colors in the u–v diagram obtained with such a HPMV lamp is indicated by the octagon identified as HPMV-I defined by the solid line. The gamut of coloration of the same test colors produced by an incandescent lamp operated at its normal color temperature of about 2800K is depicted by the broken-line octagon denoted I. As indicated by the arrows, the color-rendering of the aforesaid prior art color-modified lamp (compared to that of the incandescent lamp) causes both the golds and yellows to be strongly shifted toward the yellow-green, the blues to be strongly shifted toward the violet, and the reds to be strongly shifted toward the purple. To a lesser degree, the purple is also shifted toward the violet, and the greenish blue-greens toward the green. While the blue-greens and complexion colors are correct as far as hue is concerned, they are rendered paler than under the incandescent lamp.

The use of such color diagrams and octagons to portray the color-rendering characteristics of various light sources is well known in the art. The various octagons or gamuts of coloration are produced by using the eight CIE test-colors specified in the CRI procedure (as set forth in the publication of the International Commission of Illumination, identified as publication CIE No. 13, E-1.3.2, 1965). The eight test colors are illuminated by the light source being evaluated, the chromaticities are plotted on the color diagram and lines are drawn connecting the adjacent points to provide an octagon which is characteristic for that light source. The use of u, v color diagrams and the manner in which they are to be interpreted are described in the publication entitled "Projective Transformations of ICI Color Specifications" by D. L. MacAdam in the Journal of the Optical Society of America, Vol. 27, p. 294, 1937.

The color-distortion produced by prior art color-modified HPMV lamps (such as those described in the aforementioned Rokosz et al patent) is drastically reduced in accordance with this invention by the use of the two separate layers 29, 30 of selected phosphors that are coated onto the inner surface of the outer envelope 14. The phosphors chosen convert radiations in certain undesirable wavelength regions produced by the mercury discharge into visible radiations in different wavelength regions which improve color-rendition. Studies of the spectral emission characteristics of prior art phosphor-coated HPMV lamps revealed that the color-rendering properties chromaticity of the light output of such lamps can both be enhanced by reducing the amount of blue-violet radiations and yellow radiations and increasing the green and red emissions. The two layers 29, 30 of phosphors cooperate with one another to achieve this adjustment with a minimum loss of light output and efficacy.

The first luminescent coating 29 which is applied directly to the inner surface of the outer envelope 14 (see FIG. 2) is one which absorbs and is excited primarily by blue-violet radiations produced by the mercury arc tube 12 and emits in the green and red portions of the spectrum. The second coating 30 of luminescent material that is applied over the first coating is one which absorbs ultraviolet radiations produced by the mercury arc and also converts them into red emissions. This second coating is also one which transmits the visible radiations generated by the arc tube and thus permits the blue-violet emissions to strike and excite the first luminescent coating.

In accordance with a preferred embodiment, the first luminescent coating 29 comprises a blend of a green-emitting phosphor such as CaS:Ce and a red-emitting phosphor such as Cas:Eu. Trivalent cerium and divalent europium activators are preferred along with a suitable halide such a chlorine. Both of these phosphors absorb blue-violet radiations (380 to 490 nm. wavelength region). They are also both excited by radiations in the 254 nm. wavelength region (short uv). The red-emitting $CaS:Eu^{2+}$ phosphor has the additional advantageous characteristic that it absorbs some of the yellow light (560 nm. to 590 nm.) from the mercury arc discharge and converts it into red radiations to further reduce color distortion. A lead coactivator is also preferably used in both phosphors since it produces an additional absorption band in the long uv (around 345 nm.) and thus enables the phosphors to convert such uv radiations produced by the arc tube into red and green radiations also. The Pb coactivator can be replaced by Sn in the red-emitting $CaS:Eu^{2+}$ phosphor if desired to enhance its emission characteristics. The chlorine can also be replaced by fluorine, bromine or iodine in both the CaS:Eu and CaS:Ce phosphors without impairing their performance.

The second luminescent coating 30 is a phosphor which absorbs ultraviolet radiation and converts it into red radiation. Yttrium vanadate phosphate phosphor is preferred since it absorbs ultraviolet radiation in the wavelength region of 180 to about 350 nm. and emits in the orange-red region (590 to 710 nm.) with an emission peak at about 620 nm. (light red) and a smaller peak at about 700 nm. (deep red). Such phosphors are well known in the art and are used extensively to modify the light output of high-pressure mercury lamps. Tervalent europium is preferably used as an activator.

The phosphor coatings 29, 30 are applied to the outer envelope 14 in accordance with standard lamp-making techniques. As a specific example, the $CaS:Ce^{3+}$, Pb, Cl and $CaS:Eu^{2+}$, Pb, Cl phosphors are blended together with a suitable binder (such as nitrocellulose lacquer) and the resulting slurry or paint is milled and deposited on the inner surface of the outer envelope to form a luminescent coating 29 of substantially uniform thickness which is then dried. The yttrium vanadate phosphate phosphor is then mixed with a suitable binder (such as ethyl cellulose lacquer) to prepare a paint which, after being milled, is deposited over the first coating to form a second coating 30 of luminescent material that is also of substantially uniform thickness and coextensive with the first coating. The second coating is then dried and the envelope is lehred in the usual fashion to eliminate the binder from both coatings. Two separate lehring operatings can also be used.

In the case of a 400 watt HPMV discharge lamp 10 shown in FIG. 1 having a "BT37" type outer envelope 14 with a inner surface area approximately 650 sq. cm., a blend containing equal amounts (by weight) of cerium-activated calcium sulfide phosphor and europium-activated calcium sulfide phosphor was prepared and 1500 milligrams of the resultant phosphor blend was uniformly coated onto the envelope surface to provide a luminescent layer 29 that contained approximately 2 miligrams of phosphor per sq. cm. of envelope surface. A uniform coating of 1000 milligrams of yttrium vanadate phosphate phosphor was then applied over the first luminescent layer to provide a second layer 30 that contained approximately 1.5 milligrams of this phosphor per sq. cm. of envelope surface. Dual phosphor-coatings produced in this manner have light-filtering and radiation-conversion properties which reduce the color temperature of the mercury lamp to about 2700K and provide a light output whose chromaticity and color-rendering characteristics were very similar to that of an incandescent lamp source at the same color temperature.

If the weight ratio of CaS:Ce to CaS:Eu in the first luminescent layer is increased from 1:1 to 2:1 and the optical densities of the two layers are properly adjusted, the color temperature of the light emission produced by the lamp is close to 2900K. The preferred method of achieving lower color temperatures is simply to use a 2:1 phosphor ratio and increase the thickness of the first luminescent layer slightly to increase its light-filtering effect. Various amounts of phosphors in each layer can obviously be used, depending upon the exact color temperature and degree of color-modification desired.

The green-emitting and red-emitting calcium sulfide phosphors employed in the above-described 400 watt lamp embodiment were prepared as follows: 300 grams of calcium carbonate were mixed with 500 milligrams of $CeO_2$ (or 500 milligrams of $Eu_2O_3$ in the case of the red-emitting phosphor) and the resulting mixture was fired in an open boat at a temperature of approximately 1100° C for one-half hour in a nitrogen atmosphere, and then for an additional hour in a hydrogen sulfide atmosphere. The resulting composition was powderized and mixed with 690 milligrams of $Pb_3O_4$, 15 grams of $NH_4Cl$ and about 10 grams of sulfur and fired in capped tubes at 1100° C for 1 hour in a nitrogen atmosphere. The resulting material was powderized, milled in a Waring Blendor in a $NH_4F$-alcohol solution for 30 seconds, washed in methyl alcohol several times, dried in a vacuum funnel over a paper filter and then in open air, and finally passed through a 400 mesh screen.

Figure 4:
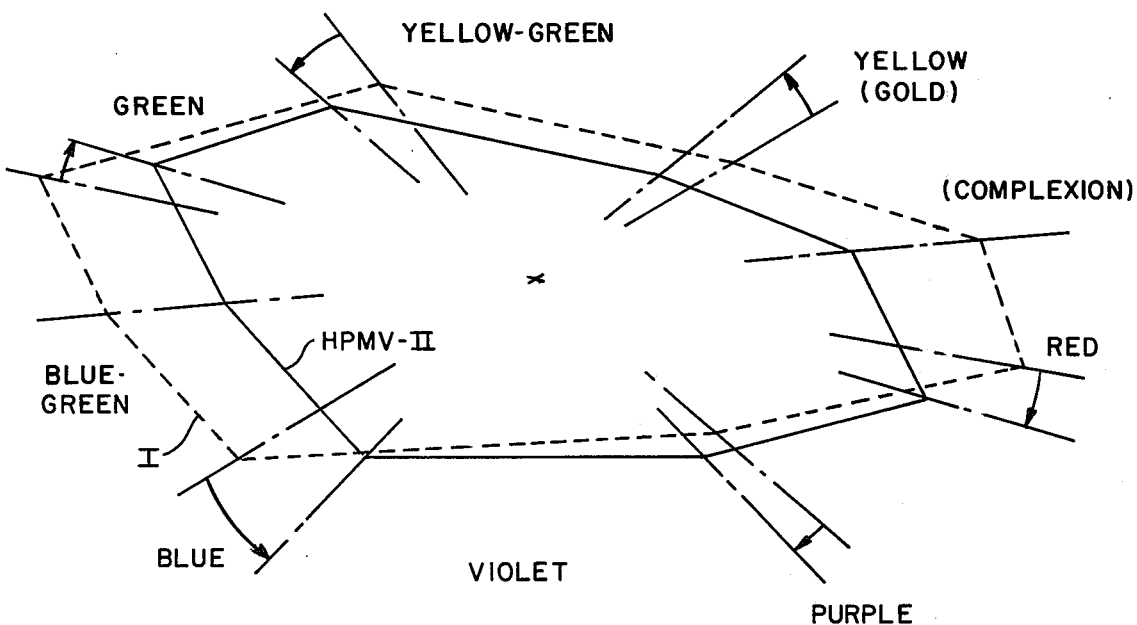
FIG. 4 is a similar diagram in which the average gamut of coloration of the CIE test-colors, as rendered by modified HPMV lamps of the present invention having color temperatures of 2700K and 2900K, is compared with the gamut of coloration obtained with an incandescent lamp source having a color temperature of about 2800K.

The improved color-rendering characteristics of HPMV lamps made in accordance with the invention are shown graphically in FIG. 4. The gamut of coloration defined by the solid-line octagon identified as HPMV-II is an average of the color-rendition effects produced by the two modified 400 watt HPMV lamps described above which had color temperatures of 2700K and 2900K. As will be noted, the color rendering closely matches that of an incandescent lamp of the same (2800K) color temperature (gamut I defined by the broken line). The hue-shifts in all but one of the color regions (yellow-green to green) are and the rendition of gold, blue and red colors is very much improved. The blue-greens, reds and complexion colors are also more saturated. These improved results were verified visually by expert observers using human subjects and selected articles, such as fabrics, rugs, etc. that included the various colors, particularly blue, gold and red.

Color-modified HPMV lamps embodying the invention and having a rating of 400 watts have efficacies which range from 40 to 50 lumens per watt, depending upon the thickness and amounts of phosphors used in the two luminescent layers. This compares to about 16 lumens per watt for an incandescent lamp of the size which would be replaced by the improved HPMV lamp.

The aforementioned cerium-activated and europium-activated calcium sulfide phosphors are well known in the art and are described in the previously-cited Lehmann Pat. No. 3,898,174, and in Lehmann's articles entitled, "The Cathodoluminescence of $CaS:Ce^{3+}$ and $CaS:Eu^{2+}$ Phosphors", Journal of the Electrochemical Society, Vol. 118, Mar. 1971, pp. 477–482; and "Activators and Coactivators In Calcium Sulfide Phosphors", Journal of Luminescence, Vol. 5, May 1972, pp. 87–107. Pursuant to the teachings of the Lehmann patent, the $CaS:Ce^{3+}$ phosphor is preferably sensitized to enhance its response to long and short uv excitation by including stannous tin, plumbous lead or cuprous copper as ingredients.

Figure 5:
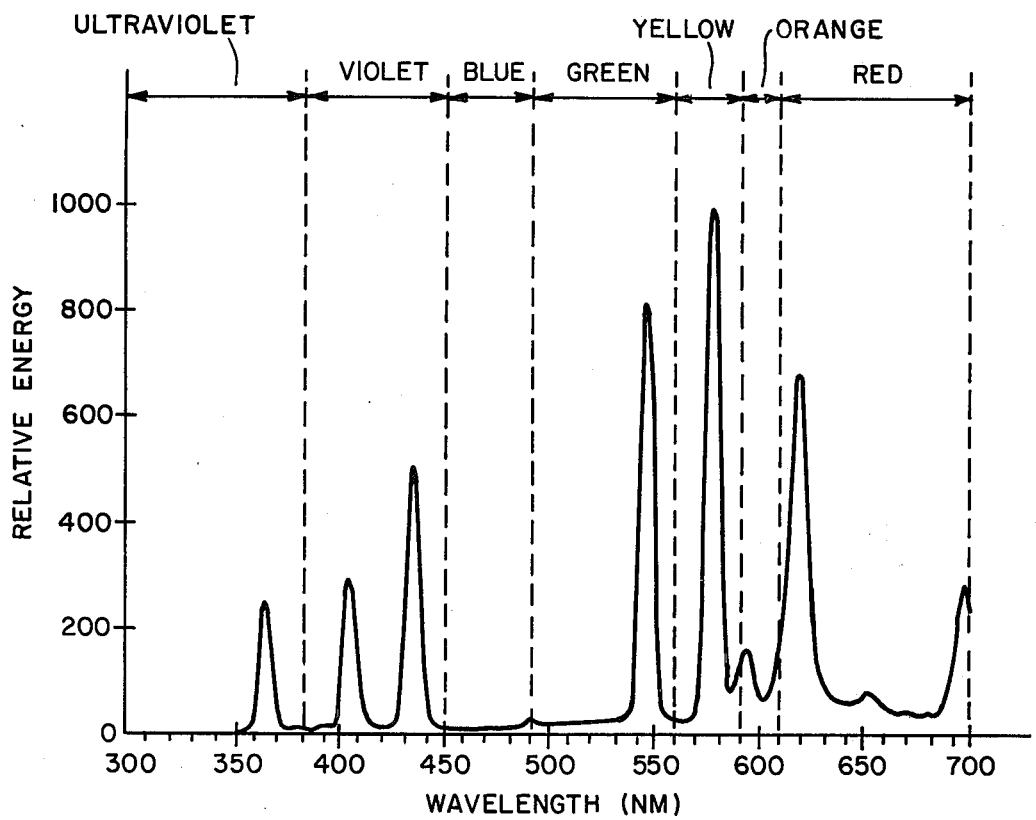
FIG. 5 is a graph illustrating the spectral power distribution of the light output provided by a preferred embodiment of the improved HPMV lamp.

The blend of the green-emitting and red-emitting phosphors in the first luminescent layer 29 and the red-emitting phosphor employed in the second luminescent layer 30 in the specific lamp embodiment described above absorbed ultraviolet radiations in the 180 to 380 nm. wavelength region, blue-violet radiations in the 380 to 490 nm. wavelength region and yellow radiations in the 560–590 nm. wavelength region produced by the mercury arc discharge and converted them into green and red radiations in the 490–560 nm. and 610-700 nm. wavelength regions, respectively. The resultant spectral distribution of the light generated by the improved HPMV lamp 10 is shown in FIG. 5. As will be noted, the light output of the color-modified lamp has a green emission which is only slightly less intense than the yellow emission, contains large amounts of orange-red radiation and has violet-blue and ultraviolet components which are less intense than the peak green and red emissions.

The invention is not limited to the preferred phosphors given above in connection with the preferred embodiment. Any phosphor which absorbs 436 nm. (blue-violet) radiation and emits in the green or red portions of the spectrum can be employed in the first luminescent layer 29. In addition to the cerium-activated calcium sulfide and europium-activated calium sulfide phosphors used in the preferred embodiment, magnesium fluorogermanate phosphor could be used even though its absorption of 436 nm. is rather weak and its red emisson is concentrated in the longer wavelength region. Another suitable phosphor for use in this layer is BaSr silicate:$Eu^{2+}$ since it absorbs 436 nm. radiation quite well and emits in the green portion of the spectrum. Thus, the first luminescent layer can comprise a blend of two or more of any of these phosphors.

An alternate phosphor suited for use in the second luminescent layer 30 is europium-activated yttrium vanadate phosphor since its absorption and emission spectra are almost identical with those of the preferred europium-activated vttrium vanadate phosphate phosphor.

As a specific example of method of preparing a BaSr silicate:$Eu^{2+}$ phosphor suitable for use as a green-emitting phosphor in the first luminescent layer, 1.35 moles of strontium carbonate, 0.6 mole of barium carbonate, 1.0 mole of silicic acid, 0.05 mole of strontium chloride, and 0.003 mole of europium oxide were admixed and fired twice at a temperature of about 1200° C for a period of 1 hour (each firing) in an atmosphere of nitrogen which contained 10% hydrogen, and the resulting composition was crushed and screened to provide particles of suitable size.

The other alternate phosphate compositions are well known to those skilled in the art and their characteristics and manner of making them are described in various patents and publications. For example, magnesium fluorogermanate phosphors are described in detail in the Thorington Pat. No. 2,748,303 and yttrium vanadate type phosphors are discussed by Luscher and Datta in the "Illuminating Engineering" article previously referred to as well as in various patents.

I claim as my invention:

1. A high-pressure mercury-vapor discharge lamp which has a light output that is modified to have color-rendering characteristics similar to those of an incandescent light source, said lamp comprising:
   an arc tube that contains mercury and an ionizable fill gas,
   a light-transmitting outer envelope surrounding and spaced from said arc tube,
   means supporting said arc tube in predetermined position within said outer envelope and providing an electric circuit for connecting the arc tube to a power source,
   means carried by said outer envelope for converting radiations of selected wavelength which are produced by said arc tube into selected radiations of longer wavelength and thereby modifying the color-rendering characteristics and chromaticity of the light generated by said arc tube when the lamp is energized,
   said modifying means comprising (a) a first layer of luminescent material that is disposed on the inner surface of said outer envelope and absorbs radiation in the blue-violet region of the spectrum which is produced by the arc tube and converts such radiations into green and red radiations, and (b) a second layer of luminescent material that extends over said first layer and absorbs ultraviolet radiations produced by said arc tube and converts such radiations into red radiations, said second layer of luminescent material being transmissive of blue-violet radiations produced by the arc tube so that such radiations can interact with and be converted by said first layer of luminescent material.

2. The mercury-vapor discharge lamp of claim 1 wherein;
   said first layer of luminescent material absorbs blue-violet radiations in the wavelength region of approximately 380 nm. to 490 nm. and converts such radiations into green radiations in the wavelength region of approximately 490 nm. to 560 nm. and red radiations in the wavelength region of approximately 610 nm. to 700 nm., and
   said second layer of luminescent material absorbs ultraviolet radiations in the wavelength region of approximately 180 nm. to 380 nm. and converts such ultraviolet radiations into red radiations in the wavelength region of approximately 610 nm. to 700 nm.

3. The mercury-vapor discharge lamp of claim 2 wherein said first layer of luminescent material also absorbs yellow radiations in the wavelength region of approximately 560 nm. to 590 nm. and converts such radiations into red radiations.

4. The mercury-vapor discharge lamp of claim 1 wherein said first layer of luminescent material comprises a blend of two phosphors, one of which emits red radiations and the other green radiations.

5. The mercury-vapor discharge lamp of claim 1 wherein said second layer of luminescent material comprises a single red-emitting phosphor.

6. The mercury-vapor discharge lamp of claim 1 wherein;
   said first layer of luminescent material comprises a blend of green-emitting phosphor and red-emitting phosphor, and
   said second layer of luminescent material comprises red-emitting phosphor.

7. The mercury-vapor discharge lamp of claim 6 wherein;
   the blended green-emitting phosphor in said first layer of luminescent material is at least one phosphor of the group consisting of cerium-activated calcium sulfide and europium-activated barium strontium silicate, and
   the blended red-emitting phosphor in said first layer of luminescent material is at least one phosphor of the group consisting of europium-activated calcium sulfide and magnesium fluorogermanate.

8. The mercury-vapor discharge lamp of claim 7 wherein the red-emitting phosphor in said second layer of luminescent material is at least one phosphor of the group consisting of europium-activated yttrium vanadate and europium-activated yttrium vanadate phosphate.

9. The mercury-vapor discharge lamp of claim 9 wherein;
   said first layer of luminescent material comprises a first substantially uniform phosphor coating of admixed green-emitting $CaS:Ce^{3+}$, Pb, Cl and red-emitting $CaS:Eu^{2+}$, Pb, Cl that extends over substantially the entire inner surface of the outer envelope, and
   said second layer of luminescent material comprises a second substantially uniform phosphor coating of europium-activated yttrium vanadate phosphate that is substantially coextensive with said first phosphor coating.

10. The mercury-vapor discharge lamp of claim 9 wherein;
    said outer envelope is transparent,
    the ratio of $CaS:Ce^{3+}$, Pb, Cl to $CaS:Eu^{2+}$, Pb, Cl in said first phosphor coating is approximately 1:1 on a weight basis, and
    the optical densities of said first and second phosphor coatings are so correlated that the color temperature of the light emission produced by the lamp is about 2700K.

11. The mercury-vapor discharge lamp of claim 9 wherein;
    the ratio of $CaS:Ce^{3+}$, Pb, Cl to $CaS:Eu^{2+}$, Pb, Cl in said first phosphor coating is approximately 2:1 on a weight basis, and
    the optical densities of said first and second phosphor coatings are so correlated that the color temperature of the light emission produced by the lamp is about 2900K.

* * * * *